United States Patent
Aoyagi et al.

(10) Patent No.: US 9,821,374 B2
(45) Date of Patent: Nov. 21, 2017

(54) METHOD FOR PRODUCING MICROPARTICLES

(71) Applicant: M. TECHNIQUE CO., LTD., Izumi-shi, Osaka (JP)

(72) Inventors: Shiho Aoyagi, Izumi (JP); Masakazu Enomura, Izumi (JP)

(73) Assignee: M. TECHNIQUE CO., LTD., Izumi-shi, Osaka (JP)

(*) Notice: Subject to any disclaimer, the term of this patent is extended or adjusted under 35 U.S.C. 154(b) by 322 days.

(21) Appl. No.: 14/379,997

(22) PCT Filed: Feb. 20, 2013

(86) PCT No.: PCT/JP2013/054087
§ 371 (c)(1),
(2) Date: Aug. 20, 2014

(87) PCT Pub. No.: WO2013/125552
PCT Pub. Date: Aug. 29, 2013

(65) Prior Publication Data
US 2015/0020647 A1    Jan. 22, 2015

(30) Foreign Application Priority Data
Feb. 21, 2012 (JP) ................................. 2012-035234

(51) Int. Cl.
*B22F 9/24* (2006.01)
*B01F 7/00* (2006.01)
(Continued)

(52) U.S. Cl.
CPC ............ *B22F 9/24* (2013.01); *B01F 7/00775* (2013.01); *B01J 19/1887* (2013.01); *C22C 13/00* (2013.01);
(Continued)

(58) Field of Classification Search
None
See application file for complete search history.

(56) References Cited

U.S. PATENT DOCUMENTS 7,384,451 B2 *   6/2008   Shiraishi ............ B01D 19/0036
                                                75/348
8,118,905 B2 *   2/2012   Enomura ............. B01D 9/0054
                                                422/209
(Continued)

FOREIGN PATENT DOCUMENTS

CN        1849260 A      10/2006
CN      101790430 A       7/2010
(Continued)

*Primary Examiner* — George Wyszomierski
(74) *Attorney, Agent, or Firm* — Birch, Stewart, Kolasch & Birch, LLP

(57) ABSTRACT

The present invention addresses the problem of providing a method for producing microparticles. Composite microparticles are separated by mixing at least two kinds of fluids to be processed in a thin film fluid that is formed between approachable and separable opposing processing surfaces that relatively rotate, wherein the fluids to be processed are a metal fluid comprising at least two kinds of metal elements that are dissolved in a solvent in the form of metal and/or metal compound and a fluid for separation containing at least one kind of separating substance for separating a composite substance comprising the at least two kinds of metal elements. The molar ratio between the at least two kinds of metal elements contained in the resulting microparticles is controlled by controlling the circumferential speed of the rotation at a confluence where the metal fluid and the fluid for separation merge at this time.

4 Claims, 4 Drawing Sheets

(51) Int. Cl.
  *B01J 19/18* (2006.01)
  *C22C 28/00* (2006.01)
  *C22C 13/00* (2006.01)
(52) U.S. Cl.
  CPC ...... *C22C 28/00* (2013.01); *B01F 2215/0409* (2013.01); *B01F 2215/0431* (2013.01); *B01F 2215/0481* (2013.01); *B01J 2219/00051* (2013.01); *B01J 2219/00186* (2013.01); *B01J 2219/00189* (2013.01); *B22F 2301/00* (2013.01)

(56) References Cited

U.S. PATENT DOCUMENTS

| | | |
|---|---|---|
| 8,708,550 B2 | 4/2014 | Enomura |
| 8,747,699 B2 | 6/2014 | Enomura |
| 2007/0134491 A1 | 6/2007 | Atsuki et al. |
| 2010/0319785 A1 | 12/2010 | Endmura |
| 2010/0327236 A1 | 12/2010 | Enomura |

FOREIGN PATENT DOCUMENTS

| | | |
|---|---|---|
| EP | 2 177 294 A1 | 4/2010 |
| EP | 2 184 109 A1 | 5/2010 |
| EP | 2 184 110 A1 | 5/2010 |
| JP | 10-316423 A | 12/1998 |
| JP | 2007-21330 A | 2/2007 |
| JP | 2009-131831 A | 6/2009 |
| JP | 2009-144250 A | 7/2009 |
| JP | 2010-90443 A | 4/2010 |
| JP | 4446128 | 4/2010 |
| WO | WO 2005/023702 A1 | 3/2005 |
| WO | WO 2009/008390 A1 | 1/2009 |
| WO | WO 2009/008393 A1 | 1/2009 |
| WO | WO 2009/008394 A1 | 1/2009 |

* cited by examiner (A)

(B)

METHOD FOR PRODUCING MICROPARTICLES

The present invention relates to a method for producing microparticles.

BACKGROUND ART

In recent years, microparticles are being used widely in industrial fields including an optical material, a magnetic material, a conductive material, an electronic material, a functional ceramic material, a fluorescent material, a catalyst material, and a chemical material. As the requirements for multifunction and downsizing in products increase, there are needs to incorporate functions therein as many as possible, and in addition, to realize further downsizing and lightening in its weight than ever before. In order to meet these needs, microparticles of the various above-mentioned materials are wanted. Besides, by transforming these materials to microparticles, the microparticles thereby obtained may acquire new physical properties such as higher activity and higher transparency.

On the other hand, in an electronic material, a magnetic material, an optical material, a heat-resistant material, a reinforcing material, a fluorescent material, a catalyst material, and a chemical material, an alloy microparticle comprising plural metal elements and a composite metal compound microparticle such as a composite metal oxide microparticle have been used; and moreover, in order to meet the diversity in their uses and performances, various composite microparticles have been proposed.

General production methods of alloy microparticles are classified roughly into a solid phase method, a gas phase method, and a liquid phase method. In the solid phase method, heat treatment at high temperature for long treatment time is necessary, and in the gas phase method, capital investment on the equipment and running cost thereof are large; and thus, naturally alloy microparticles obtained and the products obtained by using the said alloy microparticles tend to be expensive. In separation of an alloy microparticle by a coprecipitation method as shown in Patent Document 1, which is one of the liquid phase method, different behaviors of each metal element in the solution, such as diffusion of each of the metal elements in the solution in which different metals or metal compounds which are raw materials of the microparticles are contained, cannot be neglected so that to control the molar ratio between different metal elements that constitute the alloy microparticle is difficult; and as a result, to obtain the homogeneous microparticle thereof has been difficult. Accordingly, in the method for production of the alloy microparticle by the conventional liquid phase method, metal elements that can be used are limited; and thus, there have been problems that combination of metal elements as well as the ratio thereof could not be selected freely.

In addition, the method as shown in Patent Document 2 in which a liquid or a slurry that contains inorganic metal compounds is dried by contacting it with a high temperature pulse burning gas requires an equipment to generate the pulse burning gas; and thus, there have been problems of high energy cost etc.

A method for producing nanoparticles using a rotation processing method with a forced ultrathin film as shown in Patent Document 3 filed by the applicant of the present invention has been disclosed; however, undisclosed therein was the specific method to control circumferential speed of the rotation at the converging point of at least two fluids to be processed between at least two processing surfaces thereby controlling the molar ratio between different metal elements in the composite microparticle that is separated in a thin film fluid formed between the processing surfaces which are disposed in a position they are faced with each other so as to be able to approach to and separate from each other, at least one of which rotates relative to the other. Accordingly, a method for producing an alloy microparticle or a composite metal compound microparticle containing different metal elements whose molar ratio is controlled has been eagerly wanted.

PRIOR ART DOCUMENTS

Patent Document

Patent Document 1: Japanese patent Laid-Open Publication No. 2010-090443
Patent Document 2: Japanese Patent Laid-Open Publication No. 2007-21330
Patent Document 3: International Patent Laid-Open Publication No. WO 2009/008393

Problems to be Solved by the Invention

The present invention intends to solve the problems in methods for producing an alloy microparticle by conventional liquid phase methods; and thus, an object of the present invention is to provide a method for producing an alloy microparticle with which combination of metal elements as well as the ratio thereof can be selected freely.

In addition, similarly, an object of the present invention is to provide a method for producing a composite metal compound microparticle with which combination of metal elements as well as the ratio thereof can be selected freely.

Means for Solving the Problems

An invention according to claim 1 of the present application is to provide a method for producing a microparticle, wherein
at least two fluids to be processed are used,
of these at least one fluid to be processed is a metal fluid having a metal and/or a metal compound dissolved in a solvent, and
containing at least two metal elements in the metal fluid,
at least one fluid to be processed other than the one fluid to be processed is a separating fluid which contains at least one separating substance to separate a composite substance that contains the at least two metal elements,
the said fluids to be processed are mixed in a thin film fluid formed between at least two processing surfaces which are disposed in a position they are faced with each other so as to be able to approach to and separate from each other, at least one of which rotates relative substance to the other, whereby separating microparticle of the said composite substance, wherein in this method for producing the said microparticle;
circumferential speed of the rotation at a converging point of the metal fluid and the separating fluid is controlled, thereby controlling molar ratio between the at least two metal elements contained in the microparticles.

In the present invention, illustrative example of the composite substance includes an alloy which contains the above-mentioned at least two metal elements, a composite metal oxide which contains the above-mentioned at least two metal elements, a composite metal compound such as a composite metal hydroxide and a composite metal oxy hydroxide, as well as a substance which contains a metal element and a non-metal element.

An invention according to claim 2 of the present application is to provide the method for producing a microparticle according to claim 1, wherein any one of the fluids to be processed, the metal fluid and the separating fluid, passes through between both the processing surfaces while forming the thin film fluid, providing a separate introduction path independent of a flow path that is the at least any one of the fluids to be processed is passed, at least one opening part leading to the separate introduction path is arranged in at least any one of the at least two processing surfaces, and any one of the fluids to be processed, the metal fluid and the separating fluid, which is different from the foregoing at least one fluid to be processed is introduced into between the at least two processing surfaces through this opening part, whereby the metal fluid and the separating fluid are mixed in the thin film fluid.

An invention according to claim 3 of the present application is to provide the method for producing a microparticle according to claim 1 or 2, wherein by controlling the circumferential speed within the range of 0.8 to 41.9 m/second, molar ratio between the at least two metal elements contained in the microparticle is made within ±20% relative to the molar ratio between the at least two metal elements contained in the metal fluid that is mixed in the thin film fluid.

An invention according to claim 4 of the present application is to provide the method for producing a microparticle according to any one of claims 1 to 3, wherein difference in specific gravities between the at least two metal elements contained in the microparticle is 1.1 times or more.

An invention according to claim 5 of the present application is to provide a method for producing a microparticle, wherein at least two fluids to be processed are used, of these at least one fluid to be processed is a metal fluid having indium and/or a compound thereof and tin and/or a compound thereof dissolved in a solvent, and containing at least two metal elements of indium and tin in the metal fluid, at least one fluid to be processed other than the one fluid to be processed is a separating fluid which contains at least one reducing agent to separate an alloy that contains indium and tin, the said fluids to be processed are mixed in a thin film fluid formed between at least two processing surfaces which are disposed in a position they are faced with each other so as to be able to approach to and separate from each other, at least one of which rotates relative to the other, whereby separating a microparticle of an alloy that contains the indium and the tin, wherein in this method for producing the said microparticle, the separating fluid passes through between both the processing surfaces while forming the thin film fluid, providing a separate introduction path independent of a flow path that is the separating fluid is passed, at least one opening part leading to the separate introduction path is arranged in at least any one of the at least two processing surfaces, the metal fluid is introduced into between the at least two processing surfaces through the opening, whereby the metal fluid and the separating fluid are mixed in the thin film fluid, and the circumferential speed of the rotation at a converging point of the metal fluid and the separating fluid is controlled within the range of 0.8 to 41.9 m/second, thereby being molar ratio between indium and tin contained in the microparticle within ±20% relative to molar ratio between indium and tin contained in the metal fluid that is mixed in the thin film fluid.

In addition, one mere embodiment of the present may be executed as a method for producing a microparticle, wherein a fluid pressure imparting mechanism with which a pressure is applied to a fluid to be processed is arranged, of these at least two processing surfaces, a first processing member arranged with a first processing surface and a second processing member arranged with a second processing surface providing a rotation drive mechanism to rotate these processing members relative to the other, these respective processing surfaces constitutes apart of a sealed flow path through which the fluid to be processed under the pressure is passed, of the first processing member and the second processing member, at least the second processing member is arranged with a pressure receiving surface, and at least apart of the pressure receiving surface is constituted by the second processing surface, this pressure receiving surface receives a pressure that is applied by the fluid pressure imparting mechanism to the fluid to be processed thereby generating a force to move the second processing surface in a direction to separate from the first processing surface, the fluid to be processed under the pressure is passed through between the first processing surface and the second processing surface which are disposed in a position they are faced with each other so as to be able to approach to and separate from each other, at least one of which rotates relative to the other so that the fluid to be processed forms the thin film fluid, whereby separating a microparticle of a composite substance having controlled the molar ratio between the at least two metal elements in the thin film fluid.

Advantages

According to the present invention, it became possible to simply and continuously produce a composite microparticle such as an alloy microparticle and a composite metal compound microparticle with the difference in specific gravities between the different elements contained microparticle therein is 1.1 times or more. By a simple change of the processing condition, namely by changing the circumferential speed of the rotation at a converging point of the at least two fluids to be processed in between the at least two processing surfaces, the said rotation being done with regard to the processing surfaces which are disposed in a position they are faced with each other so as to be able to approach to and separate from each other, at least one of which rotates relative to the other, a composite microparticle whose molar ratio between the different metal elements contained in the microparticle is controlled can be obtained, so that the composite microparticle in accordance with the purpose thereof can be obtained with lower cost and lower energy than ever; and thus, the intended composite microparticle can be provided cheaply and stably.

Figure 4:
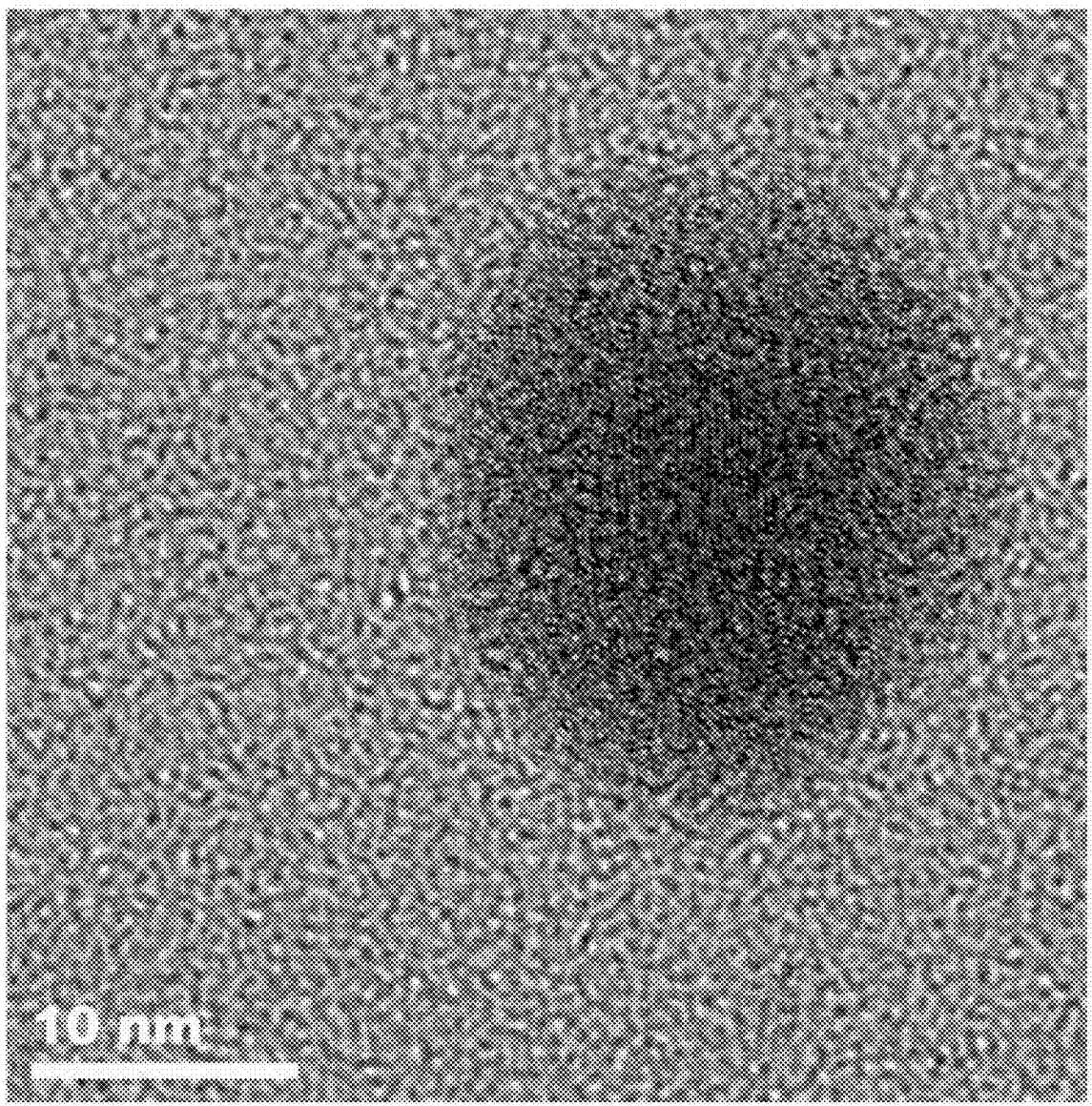

FIG. 4 This shows a TEM picture of indium-tin alloy microparticles produced in Example 4 of the present invention.

Hereunder, one embodiment of the present invention will be specifically explained.

Metal Fluid and Metals:

The metal fluid in the present invention is the fluid in which anyone of a metal and a metal compound or both are dissolved in a solvent, thereby containing the at least two metal elements.

Metals in the present invention are not particularly restricted. Preferably, all metal elements in the periodical table may be used. Illustrative example of the metal element includes Ti, Fe, W, Pt, Au, Cu, Ag, Pb, Ni, Mn, Co, Ru, V, Zn, Zr, Sn, Ta, Nb, Hf, Cr, Mo, Re, In, Ir, Os, Y, Tc, Pd, Rh, Sc, Ga, Al, Bi, Na, Mg, Ca, Ba, La, Ce, Nd, Ho, and Eu. In addition to these metal elements, non-metal elements of B, Si, Ge, As, Sb, C, N, O, S, Te, Se, F, Cl, Br, I, and At may be used as the metal elements in the present invention. These metals may be constituted of a single element; or an alloy formed of a plurality of metal elements or a substance which contains a metal element and a non-metal element may be used.

Metal Compounds:

A metal fluid in which a metal compound of these metals, in addition to a single element of the foregoing metals (including non-metal elements mentioned above), is dissolved in a solvent may be used as the metal solution. The metal compound of the present invention is not particularly restricted; and illustrative example thereof includes metal compounds in the form of a metal salt, an oxide, a hydroxide, a hydroxylated oxide, a nitride, a carbide, a complex, an organic salt, an organic complex, an organic compound, and a hydrate and an organic solvent adduct of them. The metal salt is not particularly restricted; and illustrative example thereof includes a nitrate, a nitrite, a sulfate, a sulfite, a formate, an acetate, a phosphate, a phosphite, a hypophosphite, a chloride, an oxysalt, an acetylacetonato salt, and a hydrate or an organic solvent adduct of these metal salts. Illustrative example of the organic compound includes a metal alkoxide. These metal compounds may be used singly or as a mixture of two or more of them.

Separating Substance:

The separating substance to be used in the present invention is not particularly restricted, provided that the said substance can separate at least two metal elements contained in the metal fluid as an alloy or a composite substance such as a composite metal compound. In one example thereof, in the case of producing an alloy microparticle, a substance capable of reducing a metal and/or a metal compound, preferably metal ions of at least two metal elements, contained in the metal fluid may be used, though not necessarily restricted, illustrative example thereof includes hydrazine or hydrazine monohydrate, formaldehyde, sodium sulfoxylate, a borohydride metal salt, an aluminum hydride metal salt, a triethyl borohydride metal salt, glucose, citric acid, ascorbic acid, tannic acid, dimethylformamide, pyrogallol, tetrabutyl ammonium borohydride, sodium hypophosphite ($NaH_2PO_2 \cdot H_2O$), rongalite C ($NaHSO_2 \cdot CH_2O \cdot 2H_2O$), and metal compounds or their ions preferably compounds of transition metals such as iron and titanium or their ions. The reducing agents mentioned above include hydrates, organic solvent adducts, or anhydride thereof. These reducing agents may be used singly or as a mixture of two or more of them. Alternatively, in the case of producing an oxygen-containing composite metal compound, for example in the case of producing a microparticle of a composite metal oxide, a composite metal hydroxide, or a composite metal oxy hydroxide, a fluid which contains a basic substance or an acidic substance may be used as the separating fluid. There is no particular restriction as to the basic substance; however, illustrative example thereof includes ammonias such as ammonia and ammonium salt, amines such as triethylamine and dimethylamino ethanol, hydroxides of a metal and a non-metal, a carbonate salt, a bicarbonate salt, and an alkoxide. Besides, hydrazine and hydrazine monohydrate mentioned before may also be used. The basic substances mentioned above include hydrates, organic solvent adducts, or anhydride thereof. These basic substances may be used singly or as a mixture of two or more of them. Illustrative example of the acidic substance includes inorganic acids such as hydrochloric acid, sulfuric acid, nitric acid, and aqua regia, as well as organic acids such as trichloroacetic acid, trifluoroacetic acid, phosphoric acid, citric acid, and ascorbic acid.

The separating fluid in the present invention shall contain at least one foregoing separating substances. These separating substances may be used as the separating fluid obtained by mixing with or dissolving in a solvent as mentioned later. The separating fluid includes a fluid which is in the state of dispersion solution or slurry for use.

Solvents:

The solvent to be used in the present invention is not particularly restricted; and illustrative example thereof includes water such as an ion-exchanged water, a RO water, a pure water, and a ultrapure water; alcoholic organic solvents such as methanol and ethanol; polyol organic solvents (polyvalent alcohols) such as ethylene glycol, propylene glycol, trimethylene glycol, triethylene glycol, polyethylene glycol, and glycerin; ketonic organic solvents such as acetone and methyl ethyl ketone; ester organic solvents such as ethyl acetate and butyl acetate; ether organic solvents such as dimethyl ether and dibutyl ether; aromatic organic solvents such as benzene, toluene, and xylene; and aliphatic hydrocarbon organic solvents such as hexane and pentane. If the foregoing alcoholic organic solvents or polyol organic solvents are used as the solvent, there is a merit that these solvents can act also as the reducing agent. These solvents each may be used singly or as a mixture of two or more of them.

Fluid Processing Apparatus:

In the present invention, it is preferable to separate the microparticle by the method in which a metal fluid which contains at least two metal elements obtained by dissolving a metal and/or a metal compound in a solvent is uniformly stirred and mixed with a separating fluid which contains at least one separating substance to separate a composite substance containing the at least two metal elements in a thin film fluid formed between processing surfaces which are disposed in a position they are faced with each other so as to be able to approach to and separate from each other, at least one of which rotates relative to the other. By using the apparatus based on the principle as mentioned above, the microparticle of the composite substance which contains at least two metal elements whose specific gravities are different by 1.1 times or more can be produced.

Hereinafter, embodiments of the above-mentioned fluid processing apparatus will be explained by using the drawings.

Figure 1:
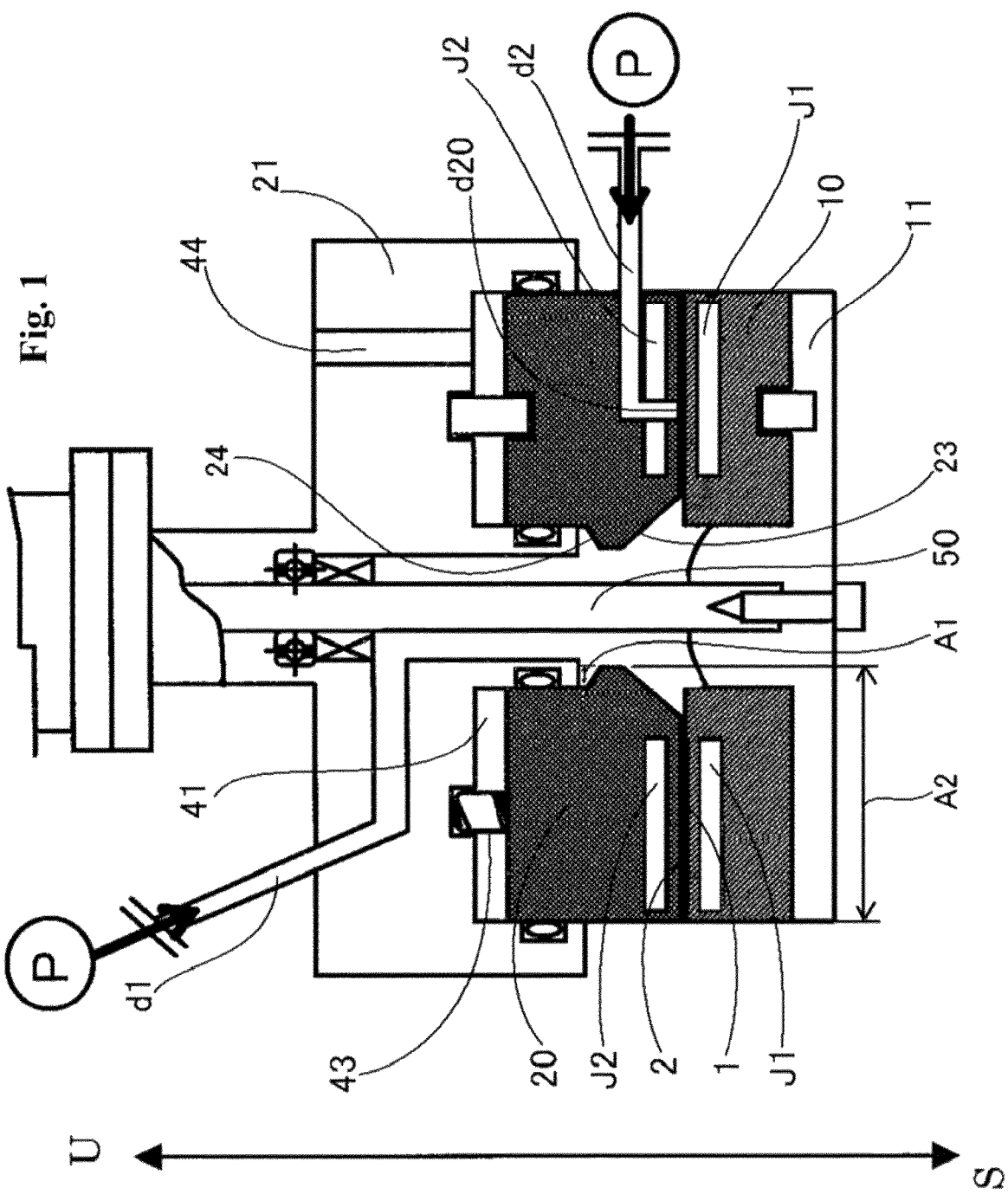
FIG. 1 is a schematic sectional view showing the fluid processing apparatus according to an embodiment of the present invention.
Figure 2:
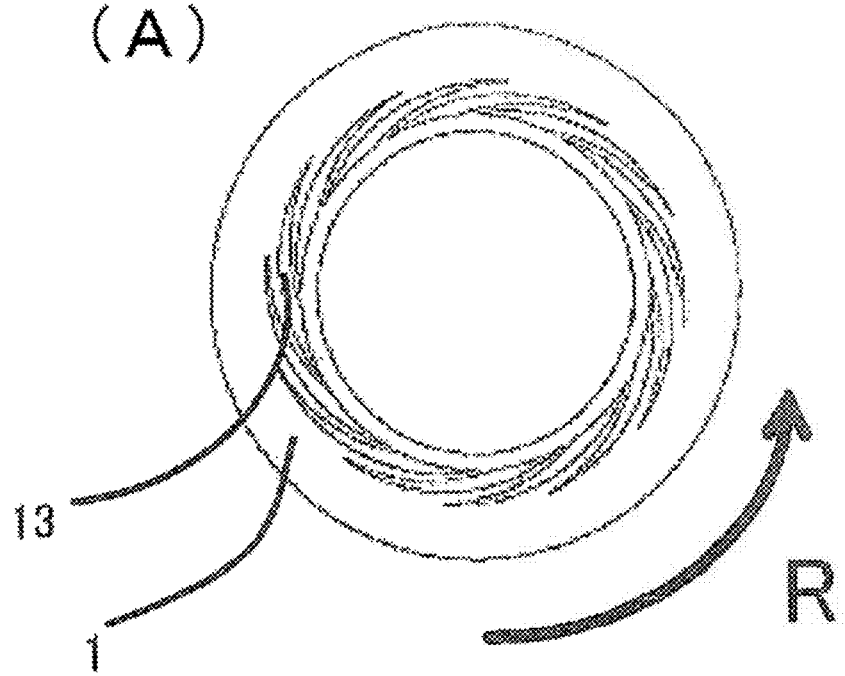
FIG. 2(A) is a schematic plane view of the first processing surface in the fluid processing apparatus shown in FIG. 1.
FIG. 2(B) is an enlarged view showing an important part of the processing surface in the apparatus.
Figure 2:
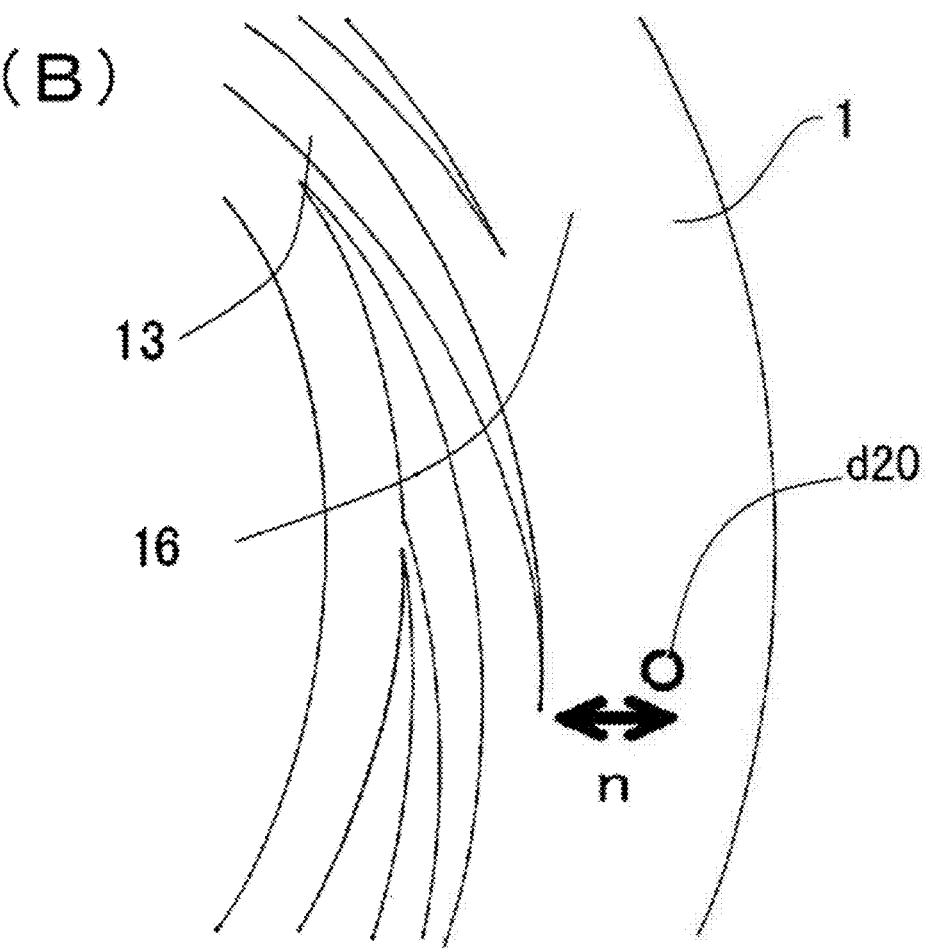
Figure 3:
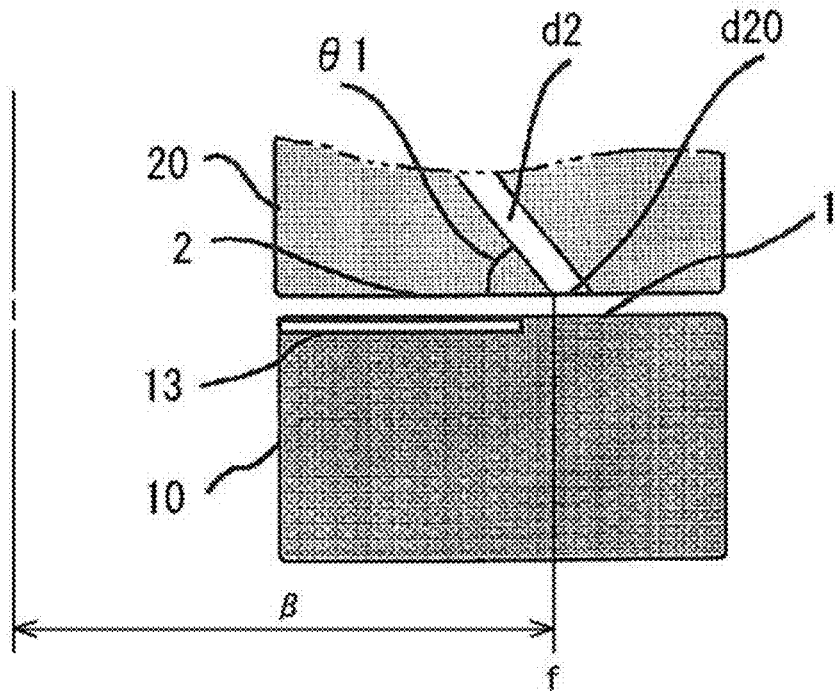
FIG. 3(A) is a sectional view of the second introduction member of the apparatus.
FIG. 3(B) is an enlarged view showing an important part of the processing surface for explaining the second introduction member.
Figure 3:
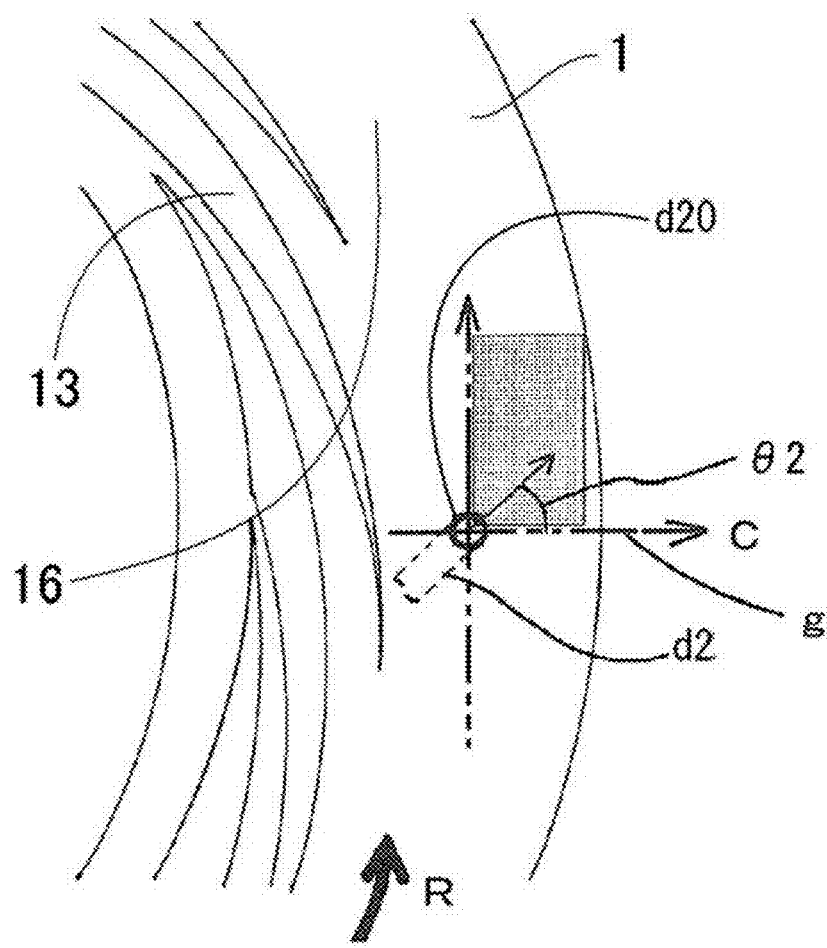

The fluid processing apparatus shown in FIG. 1 to FIG. 3 is similar to the apparatus described in Patent Document 3, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 μm to 50 μm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process (ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal and carbon but also ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 μm to 1.0 μm, or more preferably 0.03 μm to 0.3 μm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1 and 2. In this embodiment, the second introduction part d2 is a path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P=P1\times(K-k)+Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the movement of fluid, the dimensionless number which expresses the ratio of inertia force to viscosity force is called as Reynolds number, which is expressed by the following equation.

$$\text{Reynolds number } Re=\text{inertia force/viscosity force}=\rho VL/\mu=VL/\nu$$

Here, $\nu=\mu/\rho$ shows dynamic viscosity, V shows representative velocity, L shows representative length, $\rho$ shows density, and $\mu$ shows viscosity.

Flow of the fluid changes at the borderline of the critical Reynolds number; namely below the critical Reynolds number is the laminar flow, while above the critical Reynolds number is the turbulent flow.

Because the space between the processing surfaces 1 and 2 of the fluid processing apparatus is controlled so narrow that amount of the fluid that kept between the processing surfaces 1 and 2 is extremely small. Therefore, the representative length L is very short, so that the centrifugal force of the thin film fluid which passes through between the processing surfaces 1 and 2 is so small that the effect of the viscosity force in the thin film fluid becomes large. Accordingly the Reynolds number becomes smaller so that the thin film fluid becomes the laminar flow.

The centrifugal force, one of the inertia forces in rotation movement, is a force acting from a center to an outside. The centrifugal force can be expressed by the following equation.

$$\text{Centrifugal force } F=ma=mv^2/R$$

Here, "a" shows acceleration, "m" shows mass, "v" shows velocity, and R shows radius.

As mentioned above, amount of the fluid kept between the processing surfaces 1 and 2 is so small so that the ratio of the velocity relative to the fluid mass becomes very large, so that the said mass can be neglected. Accordingly, the effect of gravity can be neglected in the thin film fluid formed between the processing surfaces 1 and 2. Because of this, a microparticle of an alloy or a composite metal compound which contains two or more metal elements having different specific gravities can be separated in the thin film fluid formed between the processing surfaces 1 and 2, even though these are intrinsically difficult to be separated as the composite microparticle.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the concave portion may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

It is preferable that the base edge of this depression 13 reach the inner periphery of the first processing member 10. The front edge of the depression 13 is extended to the direction of the outer periphery of the first processing surface 1; the depth thereof (cross section area) is made gradually shallower (smaller) from the base edge to the front edge.

Between the front edge of the depression 13 and the outer peripheral of the first processing surface 1 is formed the flat plane 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow. Shape of the opening d20 may be circular as shown in FIG. 2(B) and FIG. 3(B), or a concentric circular ring shape which encircles the central opening of the processing surface 2 having a form of a ring-like disk, though this is not shown by a drawing. In the case that the opening is made in the circular ring shape, the opening having the circular ring shape may be any of continuous and discontinuous.

If the opening d20 having the circular ring shape is arranged in the way that it encircles concentrically around the central opening of the processing surface 2, the second fluid can be processed under the same condition in the circumferential direction at the time when the second fluid is introduced into between the processing surfaces 1 and 2; and thus, if the microparticle is wanted to be produced in large quantity, the shape of the opening is preferably made in the concentric circular ring shape.

This second introduction part d2 may have directionality. For example, as shown in FIG. 3(A), the direction of introduction from the opening d20 of the second processing surface 2 is inclined at a predetermined elevation angle (θ1) relative to the second processing surface 2. The elevation angle (θ1) is set at more than 0° and less than 90°, and when the reaction speed is high, the angle (θ1) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle (θ2) exists facing the rotation direction R from a reference line g, which is the line to the outward direction and in the radial direction passing through the opening d20. This angle (θ2) is also set preferably at more than 0° and less than 90°.

This angle (θ2) can vary depending on various conditions such as the type of fluid, the reaction speed, viscosity, and the rotation speed of the processing surface. In addition, it is also possible not to give the directionality to the second introduction part d2 at all.

In the present invention, the circumferential speed of the rotation at a converging point at which at least two fluids to be processed are converged together means the circumferential speed of the processing surfaces 1 and 2 in the nearest site f from the rotational center of the first and second processing surfaces 1 and 2 (hereinafter this site is referred to as the nearest point f) in the opening d20 at which the first fluid and the second fluid are converged together as shown in FIG. 3 (A); and specifically the circumferential speed is calculated from the following equation.

Circumferential speed(m/s)=2×β(m)×rotation speed (rpm)×π

Here, β shows the distance from the center of rotation of the first and second processing surfaces 1 and 2 to the nearest point f, the rotation speed is the rotation speed of the processing surfaces, and π shows the circular constant.

That is, the converging point at which at least two fluids to be processed are converged together means the nearest site to the rotational center of the first and second processing surfaces 1 and 2 in the opening part d20.

In the case that there are plurality of converging points which have different distances from the rotational center of the first and second processing surfaces 1 and 2, the nearest point to the center of the converging points at which the metal fluid and the separating fluid are converged together is taken as the nearest point f.

As mentioned above, at least two fluids to be processed that are converged together at the converging point is subjected to various fluid processing treatments including separation of microparticle of the composite substance, thereby being discharged from the processing surfaces 1 and 2 out to the processing members 10 and 20.

In the present invention, by controlling the circumferential speed of the rotation at the converging point, the molar ratio between the at least two metal elements contained in the microparticle can be controlled.

As mentioned above, in this embodiment, the first processing member 10 of the fluid processing apparatus rotates relative to the second processing member 20, whereby the first processing surface 1 rotates relative to the second processing surface 2, so that the circumferential speed at the converging point of the first processing surface 1 can be controlled. On the other hand, in the case that both the first processing surface 1 and the second processing surface 2 rotate, by controlling the relative circumferential speeds of both the processing surfaces at the converging point, the molar ratio between the at least two metal elements contained in the microparticle can be controlled.

In the present invention, the circumferential speed of the rotation at the converging point is preferably in the range of 0.8 to 41.9 m/a, or more preferably in the range of 1.2 to 21.0 m/s. If the circumferential speed at the converging point is 1 m/s or less, at least two fluids to be processed cannot be uniformly mixed, whereby the uniform separating reaction cannot be promoted; and as a result, the microparticle containing at least two metal elements cannot be obtained stably. If the circumferential speed at the converging point is 42 m/s or more, the fluids to be processed are vaporized due to increase of the temperature of the processing surfaces 1 and 2 whereby causing increase of the pressure between the processing surface; and as a result, there may be the case that the at least two fluids to be processed cannot be supplied stably. Besides, if the circumferential speed of the rotation at the converging point is 42 m/s or more, the second fluid which is introduced from the second introduction part d2 moves quickly whereby it is discharged quickly to outside the processing members 10 and 20, and therefore stable mixing of the at least two fluids to be processed, the first fluid and the second fluid, becomes difficult; and as a result, production of the uniform microparticle which contains the at least two metal elements is difficult. For the reasons mentioned above, outside the specific range, to maintain separation of the microparticle is difficult.

In addition, by controlling the circumferential speed of the rotation at the converging point within the range of 0.8 to 41.9 m/s, the molar ratio between the at least two metal elements contained in the obtained microparticle can be made within ±20% relative to the molar ratio between the at least two metal elements contained in the metal fluid that is mixed in the thin film fluid.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening for introduction may be arranged just before the first and second processing surfaces 1 and 2 or in the side of further upstream thereof.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

In the above-mentioned fluid processing apparatus, a treatment such as separation/precipitation and crystallization is effected while the fluids are being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the treated substance to be processed can be controlled by appropriately controlling rotation speed of the processing members 10 and 20, distance between the processing surfaces 1 and 2, concentration of raw materials in the fluids to be processed, kind of solvents in the fluids to be processed, and so forth.

Hereunder, specific embodiments as to the method for producing microparticles by using the above-mentioned apparatus will be explained.

In the fluid processing apparatus mentioned above, in the thin film fluid formed between the processing surfaces 1 and 2 which are disposed in a position they are faced with each other so as to be able to approach to and separate from each other, at least one of which rotates relative to the other, the metal fluid which contains at least two metal elements which is obtained by dissolving a metal and/or a metal compound in a solvent is mixed with the separating fluid which contains at least one separating substance to separate the composite substance which contains the at least two metal elements, whereby separating the microparticle of the composite substance. Accordingly this embodiment is characterized by that at this time, by controlling the circumferential speed of the rotation at the converging point at which the metal fluid and the separating fluid are converged together, the molar ratio between the at least two metal elements contained in the microparticle can be controlled.

The reaction to separate the microparticles takes place in the apparatus as shown in FIG. 1 of the present application while the fluids are being mixed forcibly and uniformly between the processing surfaces 1 and 2 which are disposed in a position they are faced with each other so as to be able to approach to and separate from each other, at least one of which rotates relative to the other.

At first, the separating fluid in which at least one separating substance is contained is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid.

Next, from the second introduction part d2, which is the separate flow path, the metal fluid which contains the at least two metal elements that is obtained by dissolving a metal and/or a metal compound in a solvent is introduced as the second fluid directly into the first fluid film formed between the processing surfaces 1 and 2.

By so doing, the first fluid and the second fluid are mixed between the processing surfaces 1 and 2 while the distance therebetween is fixed by pressure balance between the supply pressure of the fluids to be processed and the pressure that is applied between the rotating processing surfaces, thereby effecting the reaction to separate the microparticles.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

As mentioned before, the processing apparatus may be provided with, in addition to the first introduction part d1 and the second introduction part d2, the third introduction part d3; and in this case, for example, each of the first fluid, the second fluid, and the third fluid may be introduced respectively into the processing apparatus. By so doing, concentration and pressure of each fluid can be controlled separately so that the separation reaction and the particle diameter of composite microparticles may be controlled more precisely. Meanwhile, a combination of the fluids to be processed (first to third fluids) that are introduced into each of the introduction parts may be set arbitrarily. The same is applied if the fourth or more introduction parts are arranged; and by so doing, fluids to be introduced into the processing apparatus may be subdivided. In addition, temperatures of the fluids to be processed such as the first fluid and the second fluid may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

pH Region:

In the present invention, there is no particular restriction as to the pH of the metal fluid and/or the separating fluid. It may be arbitrarily changed in accordance with the kinds and the concentrations of the metal and/or the metal compound to be used and the separating substance, the purpose, the metals to be targeted, and the like.

Dispersing Agent and so Forth:

In the present invention, various dispersing agents and surfactants may be used in accordance with the purpose and the necessity. Though not particularly restricted, various commercially available general surfactants and dispersing agents as well as a newly synthesized substance may be used. Illustrative example thereof includes an anionic surfactant, a cationic surfactant, a nonionic surfactant, as well as a dispersing agent such as various polymers. These may be used singly or as a combination of two or more of them.

The surfactants and dispersing agents may be contained in the metal fluid, in the separating fluid, or in the both fluids. Alternatively, the surfactants and the dispersing agents may be contained in a third fluid that is different from the metal fluid and the separating fluid.

Temperature:

In the present invention, temperature at the time of mixing of the metal fluid with the separating fluid is not particularly restricted. Temperature may be appropriately selected in accordance with the kinds and the concentrations of the metal and/or the metal compound to be used and the separating substance, the kind of the metal to be targeted, the pH of the metal fluid and the separating fluid, and so forth.

Microparticle:

The microparticle of the present invention may be executed as the microparticle of a composite substance which contains at least two metal elements contained in the metal fluid. Illustrative example of the microparticle of the composite substance includes a microparticle of an alloy comprised of the at least two metal elements, a microparticle comprising of a metal element and a non-metal element, as well as composite metal compounds such as a composite metal oxide, a composite metal hydroxide, and a composite metal oxy hydroxide. The microparticle of the present invention shall include non-metal elements and metal elements as shown by B, Si, Ge, As, Sb, C, N, O, S, Te, Se, F, Cl, Br, I, and At.

In the case that an alloy microparticle which contains the at least two metal elements is produced, the present invention may be executed even if it contains partially an oxide, a hydroxide, an oxy hydroxide thereof. In the present invention, the composite substance includes an alloy which contains the at least two metal elements, composite metal compounds such as a composite metal oxide and a composite metal hydroxide, and a substance which contains a metal element and a non-metal element.

EXAMPLES

Hereinafter, the present invention will be explained in more detail by Examples; but the present invention is not limited only to these Examples.

It is to be noted here that the term "from the center" in the following Examples means "from the first introduction part d1" of the fluid processing apparatus shown in FIG. 1; the first fluid means the first fluid to be processed that is introduced through the first introduction part d1 of the processing apparatus as described before; and the second fluid means the second fluid to be processed that is introduced through the second introduction part d2 of the processing apparatus shown in FIG. 1, as described before.

Observation with Electron Microscope:

Observation with an electron microscope (TEM) for the primary particle diameter was made with JEM-2100 electron microscope (TEM) (manufactured by JEOL Ltd.). By using the energy dispersive X-ray spectroscopy (EDS), the composition ratio was confirmed. The measurement and observation conditions thereof are the acceleration voltage of 200 kV and the observation magnification of 500,000 or more; and the primary particle diameter was the average value of the 3 measurement points. Hereinafter, the primary particle diameter confirmed by the TEM observation is taken as the particle diameter.

Example 1

By using the fluid processing apparatus shown in FIG. 1, the indium-tin alloy microparticle was produced in accordance with the following procedure. The mixed metal solution (metal fluid) was prepared by dissolving indium (0.925% by weight as the final concentration therein) having the specific gravity of 7.31 g/cm$^3$ (20° C.) and tin (0.075% by weight as the final concentration therein) having the specific gravity of 5.80 g/cm$^3$ (20° C.) in a mixed solution of conc. hydrochloric acid and conc. nitric acid (volume ratio of 3:1). The aqueous reducing agent solution (separating fluid) was prepared by dissolving sodium borohydride (0.2% by weight as the final concentration therein) and BYK-180 (1% by weight as the final concentration therein, manufactured by BYK Japan KK) in 0.05 mol/L aqueous sodium hydroxide solution. The metal fluid and the separating solution thus prepared were mixed in the thin film fluid formed between the processing surface 1 and 2, whereby the indium-tin alloy microparticle was separated in the thin film fluid.

In Example 1, the aqueous reducing agent solution (separating fluid) was introduced as the first fluid from the center with the supply pressure of 0.50 MPaG, the supply temperature of 80° C., and the introduction rate of 500 mL/minute, while the mixed solution of metal salts (metal fluid) was introduced as the second fluid with supply temperature of 25° C. into between the processing surfaces 1 and 2 at the introduction rate of 5 mL/minute, whereby the first fluid and the second fluid were mixed in the thin film fluid. During this operation, the circumferential speed at the converging point of the first processing surface 1 was set at 0.63 m/s. Each of the supply temperatures of the first fluid and the second fluid was measured just before introduction of each of the first fluid and the second fluid into the processing apparatus (in more detail, just before introduction into between the processing surfaces 1 and 2). A dispersion solution containing the indium-tin alloy microparticles was discharged from the processing surfaces 1 and 2. The discharged dispersion solution containing the indium-tin alloy microparticles was centrifugally separated under the condition of 10,000×g for 5 minutes to settle the indium-tin alloy microparticles, and then the supernatant solution thereof was discarded. Washing by using pure water was repeated for 3 times, and then, the solid thus obtained was dried by using a vacuum oven under the conditions of 60° C. and −0.1 MPa. The particle diameter of the obtained indium-tin alloy microparticle was confirmed by the TEM observation, and the composition ratio of the microparticle was confirmed by the EDS measurement.

Examples 2 to 7 were carried out under the same conditions as those of Example 1, except that only the circumferential speed at the converging point of the first processing surface 1 was changed.

In Table 1, the circumferential speed at the converging point of the first processing surface 1, the EDS measurement results of the obtained indium-tin alloy microparticle, and the particle diameter of the indium-tin alloy microparticle in each of Examples 1 to 7 are shown. In FIG. 4, the TEM picture of the indium-tin alloy microparticle obtained in Example 4 is shown. Meanwhile, "Introduction amount in thin film" in Table 1 means respective element amounts of indium and tin in the metal fluid introduced into the thin film fluid (molar ratio; In:Sn=92.7:7.3). "EDS analysis result/introduction amount in thin film" in Table 1 means, assuming that the molar ratio of indium or tin contained in the metal fluid that is mixed in the thin film fluid is 100, the difference between the molar ratio of indium or tin contained in the obtained indium-tin alloy microparticle and the molar ratio of indium or tin contained in the metal fluid mixed in the thin film fluid relative to the molar ratio of indium or tin contained in the metal fluid mixed in the thin film fluid (percentage).

TABLE 1

| | | EDS measurement result | | | | |
| | | In | | Sn | | |
| Example | Circumferential speed (m/second) | EDS measurement result (mol %) | EDS analysis result/introduction amount in thin film (mol %) | EDS measurement result (mol %) | EDS analysis result/introduction amount in thin film (mol %) | Particle diameter (nm) |
|---|---|---|---|---|---|---|
| 1 | 0.63 | 90.48 | −2.39 | 9.52 | 30.41 | 20 |
| 2 | 0.84 | 91.40 | −1.40 | 8.60 | 17.81 | 20 |
| 3 | 1.26 | 92.05 | −0.70 | 7.95 | 8.90 | 20 |
| 4 | 7.12 | 92.86 | 0.17 | 7.14 | −2.19 | 20 |
| 5 | 20.94 | 92.44 | −0.28 | 7.56 | 3.56 | 20 |
| 6 | 41.89 | 91.29 | −1.52 | 8.71 | 19.32 | 20 |
| 7 | 42.30 | 90.67 | −2.19 | 9.33 | 27.81 | 20 |

From Table 1, it was confirmed that at the time when the first fluid and the second fluid were mixed in the thin film fluid, by mixing the both fluid in such a way that the circumferential speed at the converging point of the first processing surface 1 might become within the range or 0.8 to 41.9 m/s, the indium-tin alloy microparticle could be produced even if the difference in specific gravities between indium and tin was 1.26 times. In addition, it was confirmed that the indium-tin alloy microparticle with the respective molar ratios of indium and tin in the obtained indium-tin alloy microparticle being within ±20% relative to the respective molar ratios of the indium and tin contained in the metal fluid mixed in the thin film fluid could be produced.

Meanwhile, in these Examples, the metal fluid in which indium and tin were dissolved in a solvent was used; however, in the case that the metal fluid in which an indium compound and a tin compound are dissolved in a solvent is used, the indium-tin alloy microparticle having the molar ratio of indium and tin controlled can be produced similarly. That is, even when the metal fluid in which indium or an indium compound and tin or a tin compound are dissolved in a solvent is used, the indium-tin alloy microparticle having the molar ratio of indium and tin controlled can be produced equally.

EXPLANATION OF REFERENCE NUMERALS 1 first processing surface
2 second processing surface
10 first processing member
11 first holder
20 second processing member
21 second holder
d1 first introduction part
d2 second introduction part
d20 opening

The invention claimed is:

1. A method for producing a microparticle, comprising the steps of:
providing at least two fluids to be processed, the at least two fluids including a metal fluid having a metal and/or a metal compound dissolved in a solvent, the metal fluid containing at least two metal elements, and a separating fluid which contains at least one separating substance to separate a composite substance that contains the at least two metal elements;
introducing the at least two fluids into a processing device, the processing device comprising at least two processing surfaces facing each other, the at least two processing surfaces being operable to approach to and separate from each other, at least one of the at least two processing surfaces rotating relative to the other;
mixing the at least two fluids in a space formed between the at least two processing surfaces, thereby forming a thin film fluid between the at least two processing surfaces;
controlling a circumferential speed of the rotation at a converging point of the metal fluid and the separating fluid within a range of 0.8 to 41.9 m/second in order to control a molar ratio between the at least two metal elements contained in a separated microparticle within ±20% relative to a molar ratio between the at least two metal elements contained in the metal fluid before being introduced into the processing device; and
separating the microparticle of the said composite substance in the thin film fluid to obtain the separated microparticle,
wherein the processing device includes a first flow path for introducing one of the at least two fluids into the space between the at least two processing surfaces, and a second flow path, independent of the first flow path, for introducing the other of the at least two fluids, the second flow path leading to at least one opening formed on at least one of the at least two processing surfaces, said the other of the at least two fluids being introduced into the space between the at least two processing surfaces through the at least one opening, and
wherein the converging point at which the metal fluid and the separating fluid converge together is the nearest point in the opening from a rotational center of the at least two processing surfaces.

2. The method for producing a microparticle according to claim 1, wherein difference in specific gravities between the at least two metal elements contained in the separated microparticle is 1.1 times or more.

3. The method for producing a microparticle according to claim 1, further comprising the step of controlling the circumferential speed of the rotation at a converging point of the metal fluid and the separating fluid within a range of 1.2 to 21 m/second.

4. A method for producing a microparticle, comprising the steps of:
  providing at least two fluids to be processed, the at least two fluids including a metal fluid having indium and/or a compound thereof and tin and/or a compound thereof dissolved in a solvent, the metal fluid containing at least two metal elements of indium and tin, and a separating fluid which contains at least one reducing agent to separate an alloy that contains indium and tin;
  introducing the at least two fluids into a processing device, the processing device comprising at least two processing surfaces facing each other, the at least two processing surfaces being operable to approach to and separate from each other, at least one of the at least two processing surfaces rotating relative to the other, wherein the processing device includes a first flow path for introducing the separating fluid into a space between the at least two processing surfaces, and a second flow path, independent of the first flow path, for introducing the metal fluid, the second flow path leading to at least one opening formed on at least one of the at least two processing surfaces, said metal fluid being introduced into the space between the at least two processing surfaces through the at least one opening;
  mixing the at least two fluids in the space formed between the at least two processing surfaces, thereby forming a thin film fluid between the at least two processing surfaces;
  controlling a circumferential speed of the rotation at a converging point of the metal fluid and the separating fluid within a range of 0.8 to 41.9 m/second, such that a molar ratio between indium and tin contained in a separated microparticle within ±20% relative to a molar ratio between indium and tin contained in the metal fluid before being introduced into the processing device; and
  separating microparticle of an alloy that contains the indium and the tin in the thin film fluid to obtain the separated microparticle.

* * * * *